United States Patent
Bowen et al.

(10) Patent No.: US 7,506,354 B2
(45) Date of Patent: *Mar. 17, 2009

(54) VOD TRANSACTION ERROR CORRELATOR

(75) Inventors: Todd P. Bowen, Austin, TX (US); William H. Berger, Austin, TX (US)

(73) Assignee: Time Warner Cable, Inc., New York, NY (US)

( * ) Notice: Subject to any disclaimer, the term of this patent is extended or adjusted under 35 U.S.C. 154(b) by 510 days.

This patent is subject to a terminal disclaimer.

(21) Appl. No.: 11/255,571

(22) Filed: Oct. 21, 2005

(65) Prior Publication Data

US 2007/0050826 A1 Mar. 1, 2007

Related U.S. Application Data

(63) Continuation-in-part of application No. 11/215,939, filed on Aug. 31, 2005.

(51) Int. Cl.
*H04N 7/173* (2006.01)
*G06F 11/00* (2006.01)

(52) U.S. Cl. .................. 725/107; 725/98; 725/118; 725/129; 725/148; 714/43; 714/48

(58) Field of Classification Search .................. 725/43, 725/87–99, 93, 107; 714/4, 25, 31, 43, 48–57
See application file for complete search history.

(56) References Cited

U.S. PATENT DOCUMENTS

| | | | |
|---|---|---|---|
| 5,432,542 A | 7/1995 | Thibadeau et al. | |
| 5,666,481 A | 9/1997 | Lewis | |
| 5,884,284 A | 3/1999 | Peters et al. | |
| 5,987,135 A | 11/1999 | Johnson et al. | |
| 6,000,045 A | 12/1999 | Lewis | |
| 6,272,150 B1 | 8/2001 | Hrastar et al. | |
| 6,393,478 B1 | 5/2002 | Bahlmann | |
| 6,481,011 B1 | 11/2002 | Lemmons | |
| 6,493,656 B1 * | 12/2002 | Houston et al. | 702/187 |
| 6,526,582 B1 | 2/2003 | Brodigan et al. | |
| 6,598,057 B1 | 7/2003 | Synnestvedt et al. | |
| 6,704,288 B1 | 3/2004 | Dziekan et al. | |
| 6,718,489 B1 * | 4/2004 | Lee et al. | 714/43 |
| 6,769,127 B1 | 7/2004 | Bonomi et al. | |
| 6,862,698 B1 * | 3/2005 | Shyu | 714/57 |
| 6,898,800 B2 | 5/2005 | Son et al. | |
| 6,947,980 B1 | 9/2005 | Knudsen et al. | |

(Continued)

*Primary Examiner*—John W Miller
*Assistant Examiner*—Robert Hance
(74) *Attorney, Agent, or Firm*—The Marbury Law Group, PLLC

(57) ABSTRACT

A system and method for analyzing video-on-demand (VOD) transaction errors in a hybrid fiber coax (HFC) cable network. Raw XOD transaction error data is acquired from an XOD server. XOD-related subscriber information is acquired from a subscriber datastore. VOD transaction data is acquired from a VOD server. A correlator acquires the raw XOD transaction error, determines from the XOD-related subscriber information that a subscriber is not entitled to receive XOD service, creates filtered XOD transaction error data by removing from the raw XOD transaction error data XOD transaction errors associated with the subscriber, and correlates a filtered XOD transaction error with VOD transaction data to identify a network path of the filtered XOD transaction error. A result processor reviews the correlated transaction error data to determine whether correlated transaction error data entries are related by a common cause.

20 Claims, 8 Drawing Sheets

U.S. PATENT DOCUMENTS

| | | |
|---|---|---|
| 7,111,318 B2 | 9/2006 | Vitale et al. |
| 7,188,116 B2 | 3/2007 | Cheng |
| 7,227,889 B1 | 6/2007 | Roeck et al. |
| 7,251,820 B1 | 7/2007 | Jost et al. |
| 7,290,046 B1 | 10/2007 | Kumar |
| 7,313,749 B2 | 12/2007 | Nerl et al. |
| 7,343,614 B1 | 3/2008 | Hendricks et al. |
| 2001/0034852 A1 | 10/2001 | Kawashima |
| 2002/0019983 A1 | 2/2002 | Emsley et al. |
| 2002/0061012 A1 | 5/2002 | Thi et al. |
| 2002/0109879 A1 | 8/2002 | Wing So |
| 2002/0136165 A1 | 9/2002 | Ady et al. |
| 2002/0143775 A1 | 10/2002 | Wilkinson et al. |
| 2003/0020765 A1 | 1/2003 | Kussmaul et al. |
| 2003/0028891 A1 | 2/2003 | Hardt et al. |
| 2003/0036848 A1 | 2/2003 | Sheha et al. |
| 2003/0040936 A1 | 2/2003 | Nader et al. |
| 2003/0145075 A1 | 7/2003 | Weaver et al. |
| 2003/0163831 A1 | 8/2003 | Gall et al. |
| 2003/0167319 A1 | 9/2003 | Venkatesulu et al. |
| 2003/0195959 A1 * | 10/2003 | Labadie et al. ............... 709/224 |
| 2004/0008761 A1 | 1/2004 | Kelliher et al. |
| 2004/0044554 A1 | 3/2004 | Bull et al. |
| 2004/0054771 A1 | 3/2004 | Roe et al. |
| 2004/0111311 A1 | 6/2004 | Ingman et al. |
| 2004/0120250 A1 | 6/2004 | Langevin et al. |
| 2005/0039213 A1 | 2/2005 | Matarese et al. |
| 2005/0111063 A1 | 5/2005 | Shar et al. |
| 2005/0144641 A1 | 6/2005 | Lewis |
| 2005/0183130 A1 | 8/2005 | Sadja et al. |
| 2005/0204290 A1 | 9/2005 | Eddy et al. |
| 2005/0286466 A1 | 12/2005 | Tagg et al. |

* cited by examiner

FIGURE 4B

400
CONTINUED FROM FIGURE 4A

430
TOP ERROR PRODUCING CLUSTERS
REVIEW ALL ERRORS

| VOD CLUSTER DESCRIPTOR | CLUSTER | NO. OF ERRORS |
|---|---|---|
| [VALUE] | VALUE | [VALUE] |

435
TOP ERROR PRODUCING ASSETS
REVIEW ALL ERRORS

| | NO. OF ERRORS |
|---|---|
| ASSET | [VALUE] |
| VALUE | [VALUE] |

440
TOP ERROR PRODUCING SLICES
REVIEW ALL ERRORS

| | NO. OF ERRORS |
|---|---|
| SLICE | [VALUE] |
| VALUE | [VALUE] |

445
TOP XOD ERRORS GENERATED
REVIEW ALL ERRORS

| | NO. OF ERRORS |
|---|---|
| ERROR | [VALUE] |
| VALUE | [VALUE] |

450
TOP ERROR PRODUCING QPSKS
REVIEW ALL ERRORS

| | NO. OF ERRORS |
|---|---|
| QPSK | [VALUE] |
| VALUE | [VALUE] |

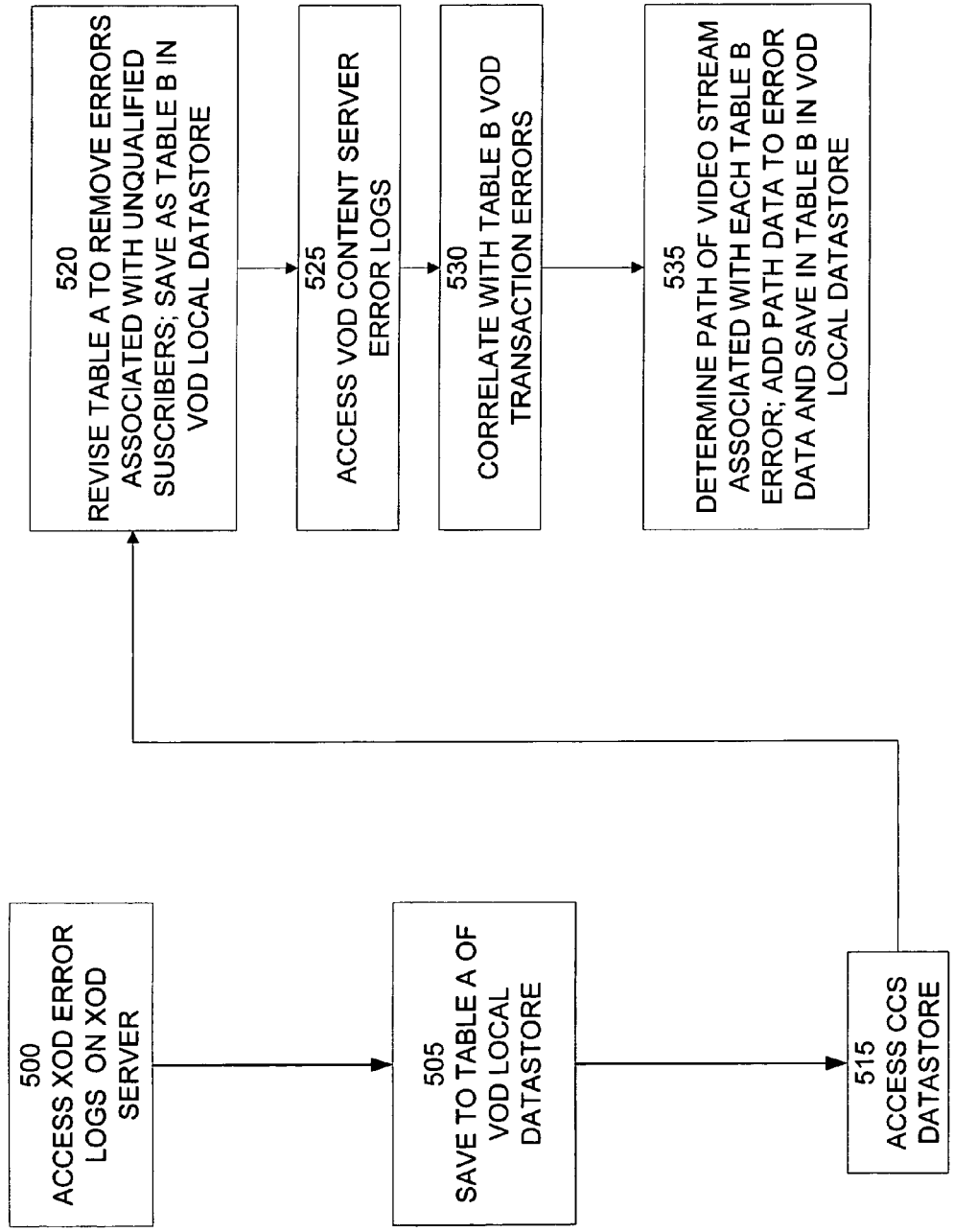

VOD TRANSACTION ERROR CORRELATOR

CROSS REFERENCE TO RELATED APPLICATIONS

This application is a continuation in part of U.S. patent application Ser. No. 11/215,939, filed Aug. 31, 2005, now pending. The 11/215,939 application is incorporated by reference herein, in its entirety for all purposes.

BACKGROUND

Embodiments of the present invention are directed generally to cable network fault isolation and more specifically to the analysis of errors reported by divergent systems comprising a video-on-demand service in a hybrid fiber coax (HFC) cable network.

HFC cable networks are increasingly dependent on two-way data transport. Video on-demand (VOD) services rely on out-of-band (OOB) channel signaling or a DOCSIS-compliant data channel to obtain requests for video content from a subscriber's set top box. In a typical configuration, the VOD service makes available to its users a selection of multiple video programs that they can choose from and watch over a network connection with minimum setup delay. At a high level, a VOD system consists of one or more VOD content servers that pass and/or store the relevant content; one or more on demand (XOD) servers that receive XOD requests from subscribers and establish the session to provide the content; and customer premises equipment (CPE) to receive, decode and present the video on a display unit. The "X" in the acronym "XOD" is indicative that the XOD server may provide a variety of programming on demand, such as but not limited to sports, movies, and music videos. As will be appreciated by those skilled in the art, the XOD server is sometimes referred to as providing "anything-on-demand." The VOD content servers provide video content in response to a request from the XOD server for video-on-demand.

The most common CPE for VOD is an addressable STB that provides the functions of receiving cable signals by tuning to the appropriate RF channel, processing the received signal and outputting VOD signals for viewing on a display unit. Such an STB also typically hosts a VOD application that enables user interaction for navigation and selection of a VOD menu.

FIG. 1 illustrates a video-on-demand provisioning system as known in the prior art. A headend 100 comprises a VOD content server 104 and an XOD server 105. The headend provides content to CPE 106 via HFC cable network 101.

The VOD content server 104 comprises a processor and a storage system and is adapted for identifying and finding a program, and for selecting the content server components to convey that content to the HFC cable network. The XOD server 105 is adapted for receiving XOD requests from subscribers, for communicating those requests to the content server, and for conveying the requested program content to the subscriber.

When a subscriber orders a movie, that request is processed from the STB through the transport network to the network controller system, then onto an XOD server. The XOD server provisions STBs to receive XOD services from the cable network operator. By way of illustration and not as a limitation, an XOD server downloads a VOD client process to an STB, sends available program listings to that STB, and determines what assets are available to the STB under what genres based on subscriber permissions. A business management system (BMS) keeps track of the negotiations, keeps records, and interfaces with the billing systems. The XOD server also instructs the VOD content server to transmit the program content through an asynchronous serial interface or gigabit Ethernet port to QAM modulators at a hub associated with a subscriber for delivery to that subscriber's STB.

The XOD server comprises logs reflecting transactions between an STB and the XOD server. An XOD transaction error will be logged when a problem occurs in the communication path between the STB and VOD content server, when the session between the VOD content server and STB is interrupted, when the STB attempts to find a program at a specified location but the program is not at the specified location, and when the transaction times out. XOD transaction errors are typically identified by an error code that identifies the type of error that was experienced.

The VOD content server processes the content request from the XOD server. The VOD content server determines whether it has the content requested and, if so, where it is located in storage. The VOD content server then determines what resources are available to deliver the content to the QAM modulator specified by the XOD server, selects the resources to be used to fulfill the request, and delivers the content. The VOD content server will also log errors that occur in the fulfillment process. By way of illustration and not as a limitation, the VOD content server may determine that the content cannot be found on the VOD content server, that the requested program is corrupted, that the VOD content server is out of resources, or that the VOD content server is not able to communicate with the designated QAM modulator.

Retrieving video content and delivering it to the correct subscriber requires detailed information regarding the association of a subscriber's STB with a particular QAM and the ability to instruct that STB to tune to a specific QAM channel. The VOD content server must be directed to convey a selected video stream to the QAM associated with the subscriber.

The XOD server and the VOD content server identify and report transaction errors independently. For example, an XOD server may report that a VOD transaction failed because of a "VOD server error." Because the XOD server does not "know" why the VOD content server failed to fulfill the VOD transaction, the error characterization by the XOD server may or may not be accurate. For example, the VOD server may have been unable to deliver the transaction because the QAM modulator information provided by the XOD server was incorrect. On the other hand, the VOD content server typically reports delivery of some content to a point in the HFC cable network as fulfillment of the subscriber's XOD request without regard to whether the content was actually received by the subscriber.

What is needed is a VOD transaction error correlator that correlates errors reported by the XOD server with the fulfillment experience as determined by the VOD content server to provide a VOD technician a "near" real-time accounting of the VOD errors occurring in the VOD provisioning system.

SUMMARY

In an embodiment of the present invention, a video-on-demand (VOD) correlation system comprises a VOD analysis server. The VOD analysis server comprises a VOD error correlator that acquires and processes transaction error data from VOD content server error logs and XOD server error logs (herein collectively, "raw data") and subscriber information from a Central Control System (CCS) datastore. The error log data from the XOD server is captured and stored in the VOD local datastore. Using the data from the CCS datastore, the correlator removes from the VOD local datastore those non-delivery "errors" generated by subscribers whose VOD service privileges have been terminated or suspended for non-payment, for exceeding credit limits, and for other administrative issues. Using data from the VOD content server logs, the correlator determines a path taken by a video stream associated with each of the remaining VOD transaction errors. These "correlated data" are written to the VOD local datastore and retrieved by a VOD retrieval manager.

A result processor reviews the correlated transaction error data to determine whether correlated transaction error data entries are related by a common cause. The raw data, the correlated data and the output of the results processor are passed to a translator that provides descriptive names to network devices within a path taken by a video stream. The raw data, the correlated data and the output of the results processor are displayed on an interactive graphical display using the descriptive names provided by the translator.

In another embodiment of the present invention, the VOD analysis server comprises a "Web" server and the raw data, the correlated data and the output of the results processor are presented in the form of a "Web" page to the interactive graphical display.

A VOD checker client accesses the interactive graphical display via a LAN connected to the VOD analysis server. In this embodiment, the VOD checker client comprises a VOD checker query interface (VQI), a processor, a display, a user input, and a LAN interface. In another embodiment of the present invention, the processor, the display, the user input, and LAN interface functions are provided by a general purpose computing device known in the art, and the VQI functionality is provided by a Web browser.

It is therefore an aspect of the present invention to correlate VOD transaction errors reported by an XOD server with video stream data provided by a VOD content server.

It is another aspect of the present invention to present the VOD transaction errors graphically to facilitate isolation of the source of the VOD transaction error.

It is yet another aspect of the present invention to determine the path of a video stream associated with a VOD transaction error.

It is even another aspect of the present invention to assign descriptive names to network components within a video stream path.

It is still another embodiment of the present invention to retain raw data and correlated data for historical analysis.

These and other aspects of the present invention will be apparent from a review of the general and specific descriptions that follow.

In another embodiment of the present invention, a video-on-demand (VOD) analysis server for a hybrid fiber coax (HFC) cable network comprises a query library and a correlator. The query library comprises instructions for acquiring raw XOD transaction error data from an XOD server, acquiring XOD-related subscriber information from a subscriber datastore, and acquiring VOD transaction data from a VOD server. The raw XOD transaction error data comprise an identifier associating a raw XOD transaction error with a subscriber. The correlator acquires the raw XOD transaction error data by executing instructions from the query library for acquiring raw XOD transaction error data from an XOD server, determines from the XOD-related subscriber information that a subscriber is not entitled to receive XOD service, creates filtered XOD transaction error data by removing from the raw XOD transaction error data the XOD transaction errors associated with the subscriber, and correlates a filtered XOD transaction error with VOD transaction data to identify a video stream path of the filtered XOD transaction error.

By way of illustration and not as a limitation, XOD transaction error data comprise a timestamp, a QAM output port, an asset name, a geographical area, and a VOD service group. By way of illustration and not as a limitation, VOD transaction data comprise a VOD server identifier, a VOD slice identifier, a VOD output port identifier, a stream identifier, and an asset name. By way of illustration and not as a limitation, XOD-related subscriber information comprises VOD entitlement data indicative of the right of the subscriber to receive VOD service.

In another embodiment of the present invention, the correlator also stores the raw XOD transaction error data in a local VOD datastore, creates correlated XOD transaction error data comprising the filtered XOD transaction error and the video stream path associated with the filtered XOD transaction error, and stores the correlated XOD transaction error data in the VOD local datastore.

In yet another embodiment of the present invention, the VOD analysis server further comprises a VOD data retrieval manager and a display server. The VOD data retrieval manager polls the local VOD datastore for the correlated XOD transaction error data and provides the correlated XOD transaction error data to a display server. The display server extracts error data elements from the correlated XOD transaction error data, creates a VOD analytical record comprising the error data elements, and sends the VOD analytical record to a VOD checker client for display. In an embodiment of the present invention, the VOD checker client comprises a Web browser and the analytical record comprises a Web page. In still another embodiment of the present invention, the VOD analysis server further comprises a result analyzer. The result analyzer extracts error data elements from the correlated XOD transaction error data, selects error data elements determined to be outside a predetermined range, determines if the selected error data elements are indicative of a common fault; and if the selected error data elements are indicative of a common fault, then identifies the common fault in the analytical record.

In another embodiment of the present invention, the VOD analysis server further comprises a client network interface. The client network interface communicates with the VOD checker client via a client network. By way of illustration and not as a limitation, the client network may be, without limitation, a wired network, a wireless network, a local area network, or the Internet.

An embodiment of the present invention provides a method for analyzing video-on-demand (VOD) transaction errors in a hybrid fiber coax (HFC) cable network. Raw XOD transaction error data are acquired from an XOD server. The raw XOD transaction error data comprise an identifier associating a raw XOD transaction error with a subscriber. XOD-related subscriber information is acquired from a subscriber datastore. VOD transaction data is acquired from a VOD server. Using the XOD-related subscriber information, a determination is made that a subscriber is not entitled to receive XOD service. Filtered XOD transaction error data is created by removing from the raw XOD transaction error data the XOD transaction errors associated with the subscriber. A filtered XOD transaction error is correlated with VOD transaction data to identify a video stream path of the filtered XOD transaction error.

By way of illustration and not as a limitation, XOD transaction error data are selected from the group consisting of a timestamp, a QAM output port, an asset name, a geographical area, and a VOD service group. By way of illustration and not as a limitation, VOD transaction data comprise a VOD server identifier, a VOD slice identifier, a VOD output port identifier, a stream identifier, and an asset name. By way of illustration and not as a limitation, XOD-related subscriber information comprises VOD entitlement data indicative of the right of the subscriber to receive VOD service.

In another embodiment of the present invention, the raw XOD transaction error data are stored in a local VOD datastore. Correlated XOD transaction error data comprising the filtered XOD transaction error and the video stream path associated with the filtered XOD transaction error are created. The correlated XOD transaction error data are stored in the VOD local datastore.

In yet another embodiment of the present invention, the local VOD datastore is polled for the correlated XOD transaction error data. The error data elements are extracted from the correlated XOD transaction error data. A VOD analytical record comprising the error data elements is created. The VOD analytical record is sent to a VOD checker client for display. In an embodiment of the present invention, the VOD checker client comprises a Web browser and the analytical record comprises a Web page.

In another embodiment of the present invention, error data elements are extracted from the correlated XOD transaction error data. Error data elements determined to be outside a predetermined range are selected. A determination is made whether the selected error data elements are indicative of a common fault. If the selected error data elements are indicative of a common fault, then the common fault is identified in the analytical record.

DESCRIPTION OF THE DRAWINGS

FIGS. 4A and 4B illustrate an interactive graphical display produced by a VOD analysis server according to an embodiment of the present invention.

FIG. 5 illustrates a process by which a VOD local datastore is populated with correlated and partially correlated XOD error transaction data according to an embodiment of the present invention.

DETAILED DESCRIPTION

Figure 1:
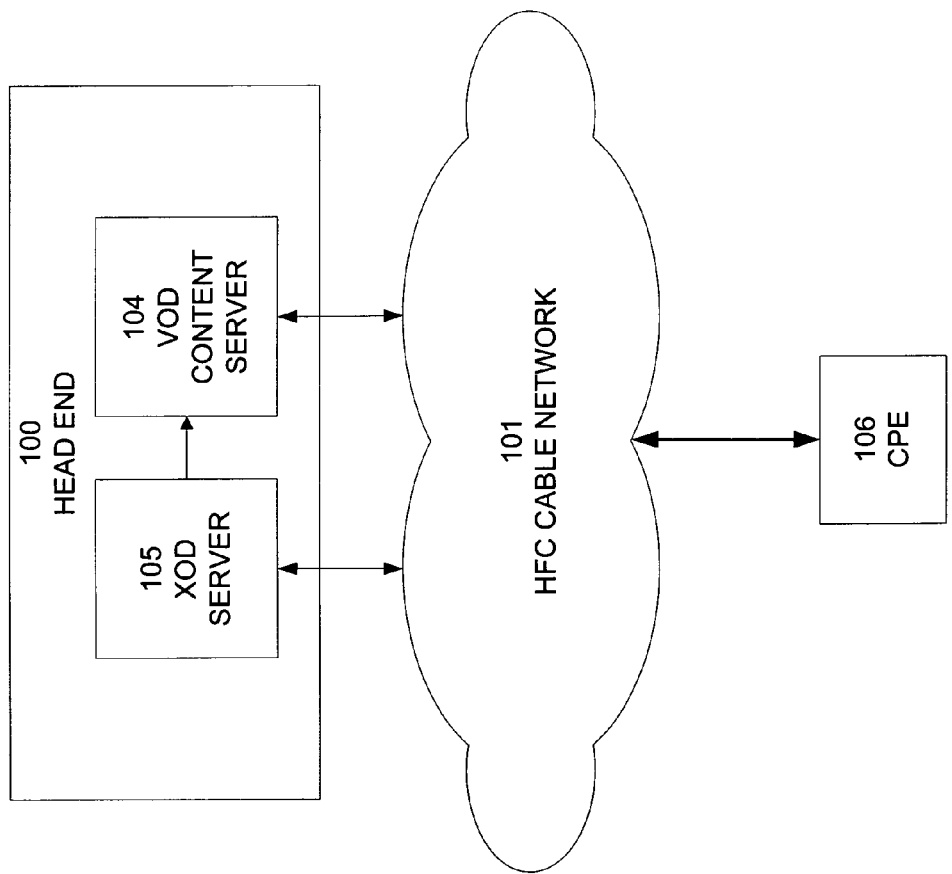
FIG. 1 illustrates a video-on-demand provisioning system as known in the prior art.

The following terms are used in the description that follows. The definitions are provided for clarity of understanding:

| | |
|---|---|
| CPE - | Customer premises equipment. |
| HFC - | Hybrid Fiber Coax. A network design that employs both fiber optic and coaxial cables to deliver cable video and data services. |
| Hub - | The local source of cable services. By way of illustration and not as a limitation, a hub may serve 20,000 subscribers. |
| QAM modulator - | A device within a headend that receives a video stream from a VOD content server, modulates the video stream, and directs the video stream over a downstream QAM channel to a subscriber. |
| Session - | A session is a stream of video programming being received over an IP network. A session is identified by its UDP port number. |
| STB - | Set top box. As used herein, a STB comprises a standalone device and a device meeting the OpenCable Applications Platform Specification (OCAP), sometimes referred to as a DSG client. |
| Stream - | A stream is the output from an MPEG audio or video encoder. The output of a single encoder is an elementary stream (ES). One video stream and one or more audio streams can be combined by means of a shared clock reference into a program, which is the basic unit of a digital video service. |
| TSID - | At each hub, each QAM channel must have a unique transport stream ID (TSID) to allow a STB to locate and receive the VOD content stream. |
| VOD - | Video-on-demand. |
| VOD cluster - | A group of VOD content servers. |
| VOD content server - | A computer system adapted to store, locate, retrieve and convey video content as video stream to a specified QAM modulator within an HFC cable network. |
| VOD node - | A particular VOD content server within a VOD cluster. |
| VOD service group - | a segment of a network node indicative of the QAMs that a particular subscriber may use to deliver XOD services to a subscriber. |
| VOD transaction error data - | Errors reported by a VOD system. |
| XOD - | Anything on demand. XOD is the generic term for a collection of services such as VOD, HBO on demand (HOD), movies on demand (MOD), SVOD (subscription video-on-demand), FOD (free on demand), and other similar services. |
| XOD server - | A computer system adapted to establish and manage on demand sessions between subscribers and a VOD content server. |
| XOD transaction error data - | data indicative of the failure of an on demand request by a subscriber to be fulfilled. |

In an embodiment of the present invention, a video-on-demand (VOD) correlation system comprises a VOD analysis server. The VOD analysis server comprises a VOD error correlator that acquires and processes XOD server error logs (herein collectively, "raw data") and subscriber information from a Central Control System (CCS) datastore. The error log data from the XOD server is captured and stored in the VOD local datastore. Using the data from the CCS datastore, the correlator removes from the VOD local datastore those non-delivery "errors" generated by subscribers whose VOD service privileges have been terminated or suspended for non-payment, for exceeding credit limits, and for other administrative issues. Using data from the VOD content server logs, the correlator determines a path taken by a video stream associated with each of the remaining VOD transaction errors. These "correlated data" are written to the VOD local datastore and retrieved by a VOD retrieval manager. Partially correlated data are also retained in the VOD local datastore and checked periodically to determine if correlation with a data stream can be completed.

A result processor reviews the correlated transaction error data to determine whether correlated transaction error data entries are related by a common cause. The raw data, the correlated data and the output of the results processor are passed to a translator that provides descriptive names to network devices within a path taken by a video stream. The raw data, the correlated data and the output of the results processor are displayed on an interactive graphical display using the descriptive names provided by the translator.

In another embodiment of the present invention, raw data, the correlated data and the output of the results processor are presented in the form of a "Web" page to the interactive graphical display.

A VOD checker client accesses the interactive graphical display via a LAN connected to the VOD analysis server. In this embodiment, the VOD checker client comprises a VOD checker query interface (VQI), a processor, a display, a user input, and a LAN interface. In another embodiment of the present invention, the processor, the display, the user input, and the LAN interface functions are provided by a general purpose computing device and the VQI functionality is provided by a Web browser.

Figure 2:
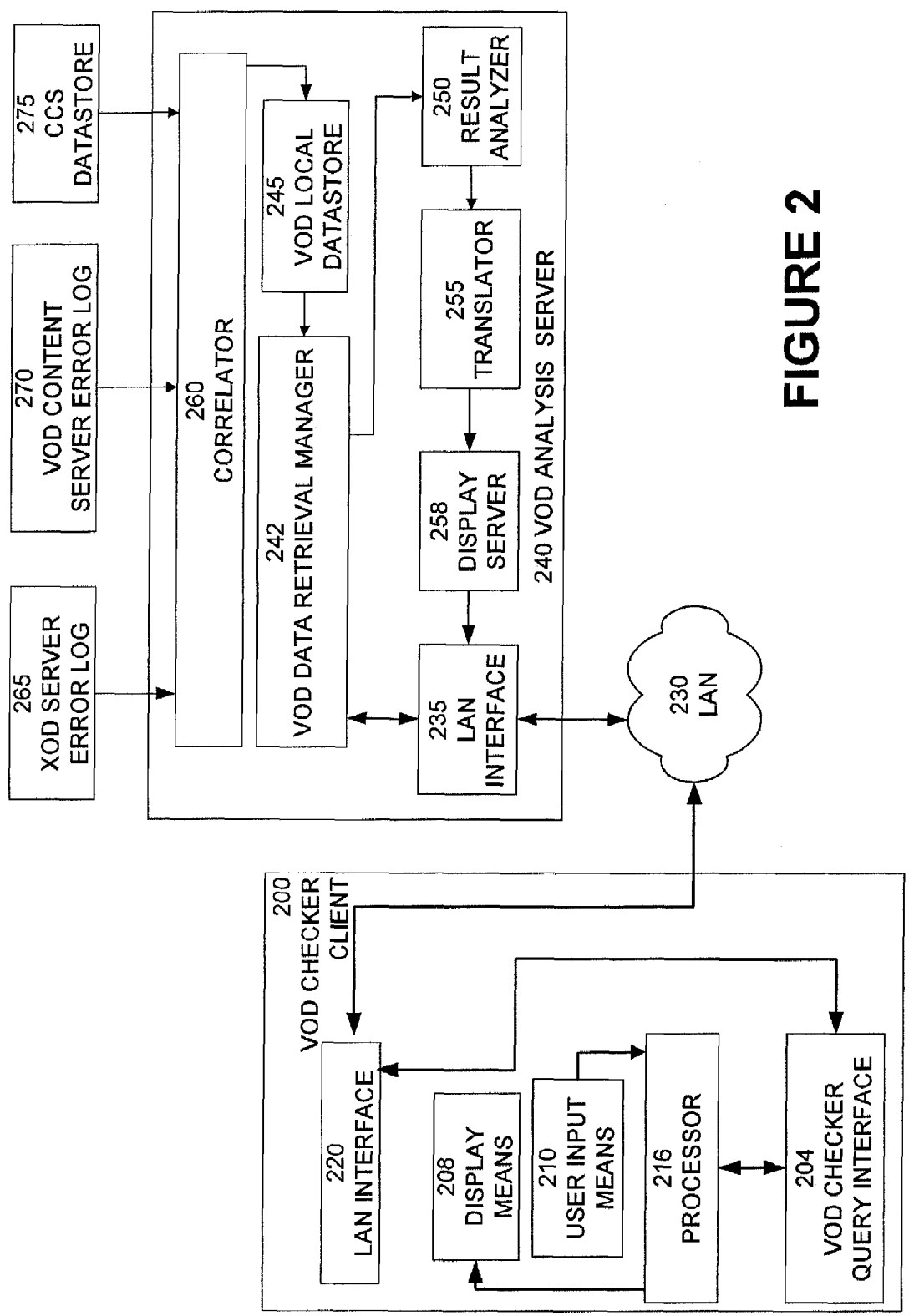
FIG. 2 illustrates the logical elements of a VOD checker client and VOD analysis server in a cable television system according to an embodiment of the present invention.

FIG. 2 illustrates the logical elements of a VOD checker client and VOD analysis server in a cable television system according to an embodiment of the present invention. Referring to FIG. 2, a VOD checker client 200 comprises a VOD query interface ("VQI") 204, a display 208, a user input 210, a processor 216 and a LAN interface 220.

In another embodiment of the present invention, display 208, user input 210, processor 216 and LAN interface 220 are provided by a general purpose computing device. By way of illustration and not as a limitation, the general purpose computing device may be, without limitation, a laptop computer, a personal digital assistant, or a handheld computer. As will be appreciated by those skilled in the art, other general purpose and portable wireless computing devices may be used to provide the functions of display 208, user input 210, processor 216 and LAN interface 220 without departing from the scope of the present invention.

Display 208 may be, without limitation, an LCD, a plasma, or other display device. User input 210 may be, without limitation, a mouse, a touch pad, a keypad, a key board, a touch-sensitive screen, a voice recognition system or other input device suitable for the particular computing device providing the functions of VOD checker client 200.

In another embodiment of the present invention, the functionality of VQI 204 is provided by a Web browser.

VQI 204 interacts with VOD analysis server 240 via LAN interface 220, LAN 230, and LAN interface 235. LAN interface 235 passes VOD queries from VOD checker client 200 to VOD data retrieval manager 242 within VOD analysis server 240. VOD analysis server 240 may be, without limitation, located in a cable network headend, in a cable network data center, in a network operations center or other suitable location determined by the cable network operator. In another embodiment of the present invention, VOD analysis server 240 comprises a display server 258 that provides Web pages to VOD checker client 200 via VQI 204.

The LAN 230 and its associated interfaces, 220 and 235, provide a communication path between VOD checker client 200 and VOD analysis server 240. As will appreciated by those skilled in the art, LAN 230 may be, without limitation, a wired or wireless network and interfaces 220 and 235 are selected as appropriate to the network type.

When VOD analysis server 240 is first accessed by VQI 204, VOD data retrieval manager 242 retrieves VOD transaction error data from VOD local datastore 245 and forwards those data to result analyzer 250.

The VOD transaction error data within VOD local datastore 245 are derived and stored by correlator 260.

Figure 3A:
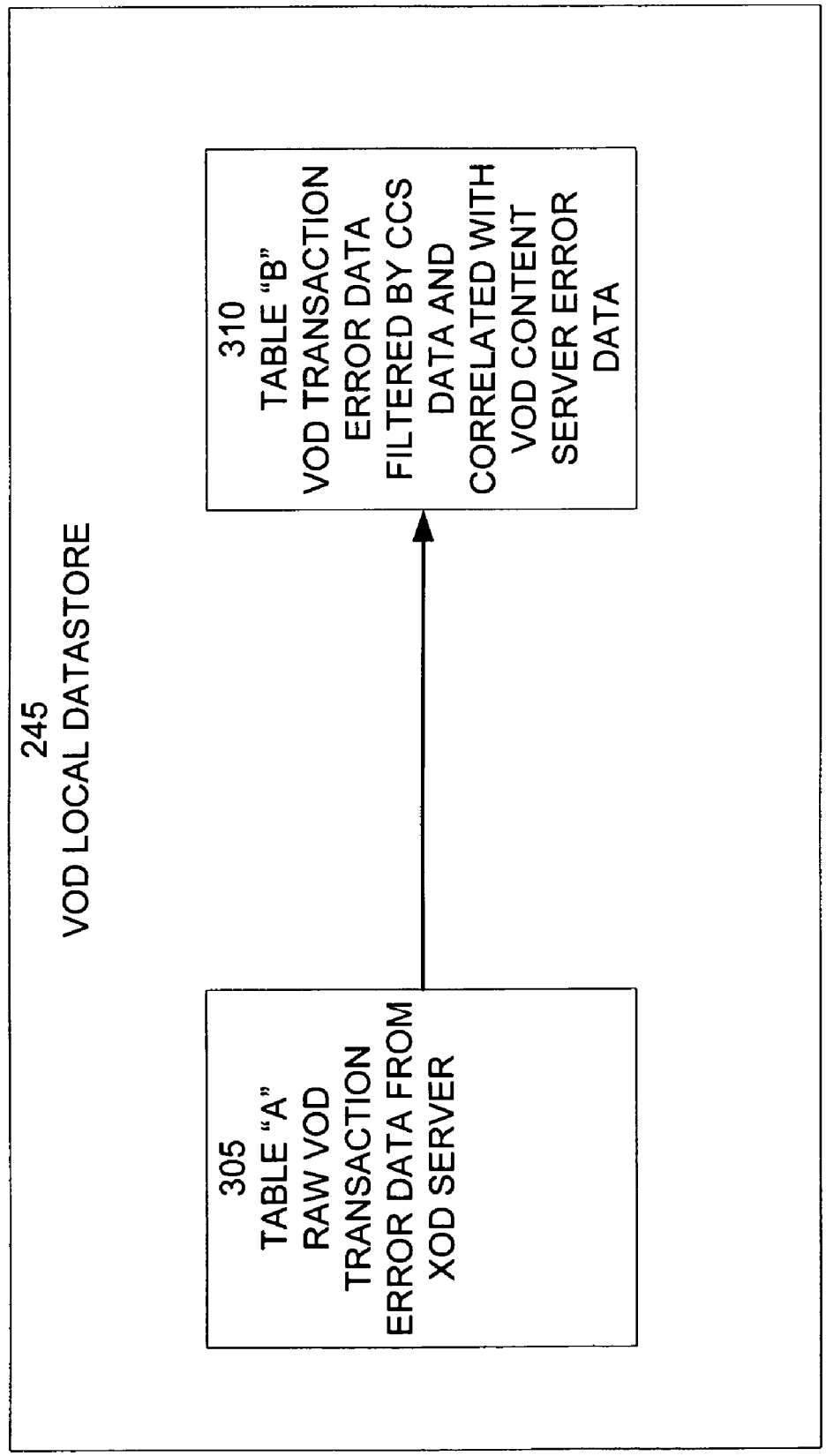
FIG. 3A illustrates the structure of VOD local datastore according to an embodiment of the present invention.

FIG. 3A illustrates the structure of VOD local datastore according to an embodiment of the present invention. Referring to FIG. 3A, VOD local datastore 245 comprises table A 305, comprising raw XOD transaction error data from XOD server error log (see FIG. 2, 265).

Referring again to FIG. 2, correlator 260 acquires XOD transaction error data from XOD server error log 265 and writes these data to VOD local datastore 245 in "raw form." In another embodiment of the present invention, correlator 260 periodically acquires XOD transaction error data from the XOD server error log 265 using an acquisition time interval that is less than the lifetime of that data as established by a VOD content server (not illustrated). For example, if the lifetime of an XOD transaction error within XOD server error log 265 is ten minutes, the acquisition time interval of correlator 260 would be less than or equal to ten minutes.

Correlator 260 also acquires subscriber information from the CCS datastore 275. In another embodiment of the present invention, subscriber information is used by correlator 260 to determine if the subscriber is entitled to receive the program content requested by the subscriber. For example, a subscriber's account may be "frozen" because of unpaid invoices for service or because the subscriber has exceeded a credit limit established for pay-per-view VOD programming. The XOD server error log 265 will reflect that the subscriber's request was not fulfilled and log a XOD transaction error. In another embodiment of the present invention, correlator 260 eliminates these transaction errors from the XOD transaction error data reported by XOD server error log 265.

Referring again to FIG. 3A, table "B" within VOD local datastore 245 comprises XOD transaction data filtered by subscriber information from the CCS datastore 275. Referring again to FIG. 2, correlator 260 also acquires VOD transaction data from VOD content server error log 270. These data are correlated with the XOD transaction error data acquired from XOD server error log 265 and stored in VOD local datastore 245.

Figure 3B:
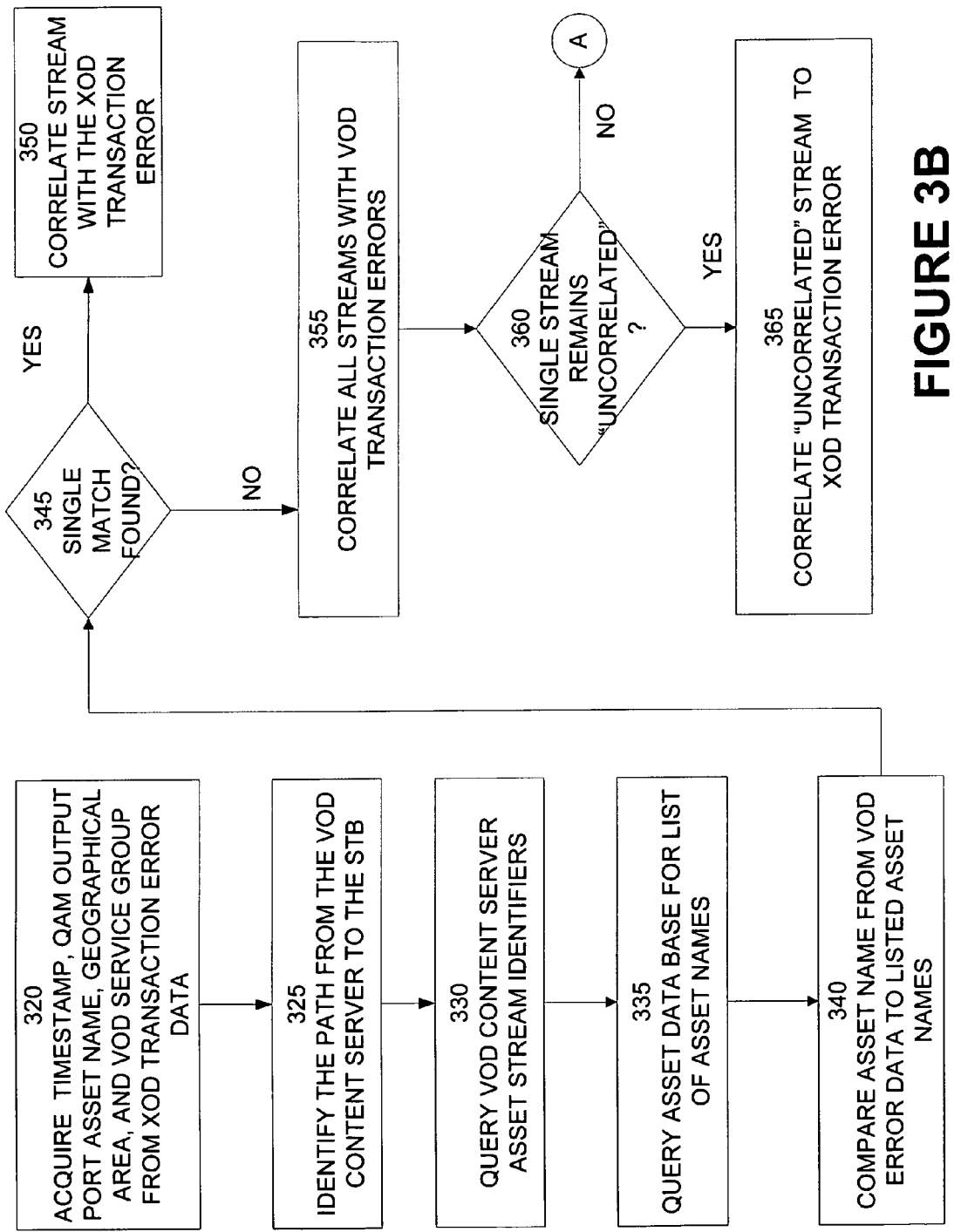
FIGS. 3B and 3C illustrate a block diagram of a process by which XOD transaction error data and VOD transaction log data are correlated according to an embodiment of the present invention.
Figure 3C:
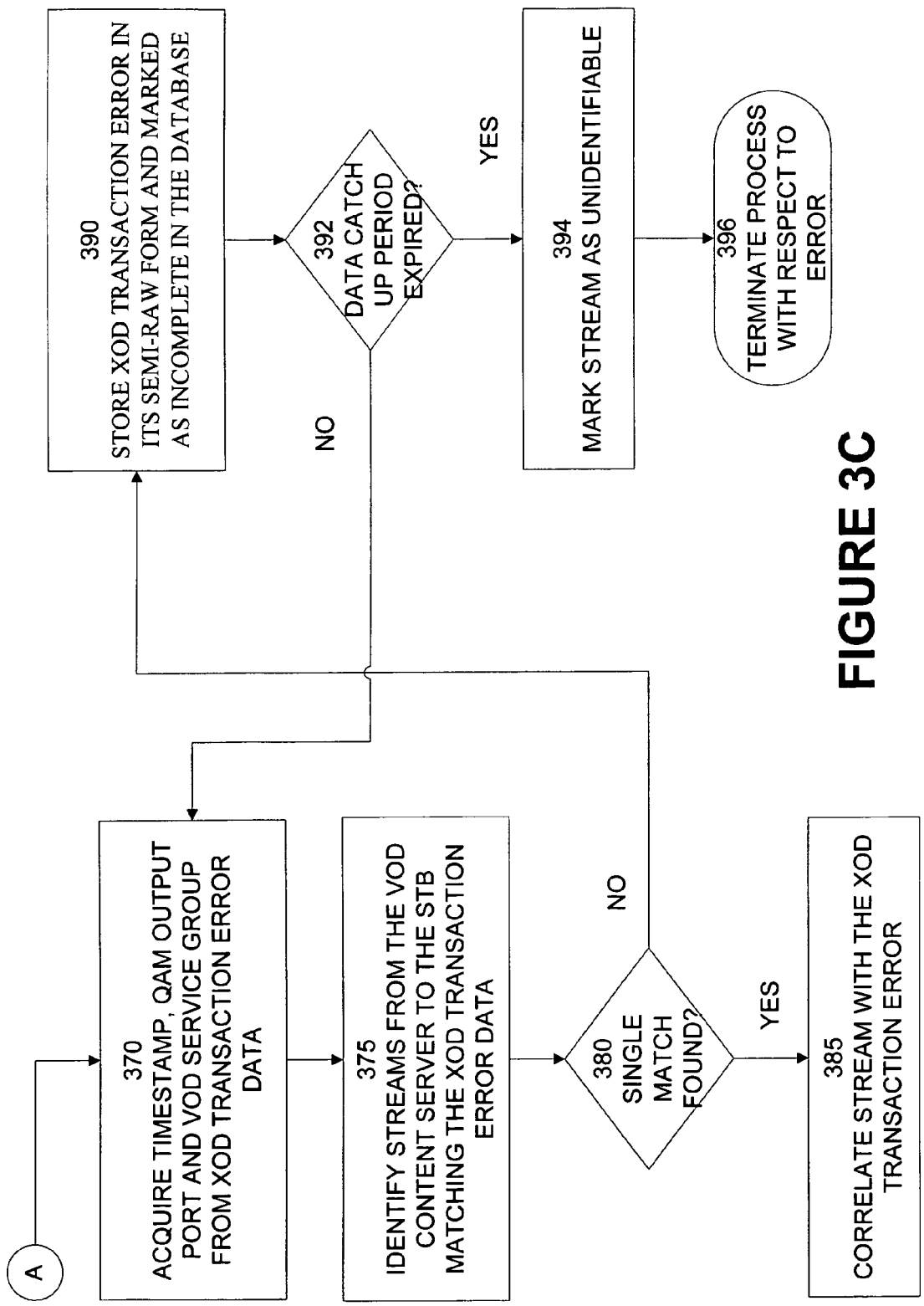

FIGS. 3B and 3C illustrate a block diagram of a process by which XOD transaction error data and VOD transaction data are correlated according to an embodiment of the present invention.

Referring to FIG. 3B, the XOD transaction error data is parsed to acquire the timestamp, output device (QAM output port), asset name, geographical area, and VOD service group of the STB that ordered the asset 320. The path from the VOD content server to the STB is identified 325. This is accomplished by translating the VOD Service group to a certain set of QAMs. This set of QAMs correlates to an output port on a "slice" of a specific VOD content server (also referred to as a "VOD node").

The VOD content server is queried for any asset presented on VOD content server A, slice B, output port C at time X 330. The query produces one or more stream identifiers meeting the query criteria. Using the stream identifiers, an asset data base associated with the VOD content server is queried for a list of asset names 335. Each listed asset is associated with a single stream.

The asset name from the XOD transaction error data is compared to the listed asset names 340. A determination is made whether the asset identified in the XOD transaction error data matches a single asset name returned by the VOD asset database 345. It should be noted that a VOD content server and an XOD server may have separate methods for formatting the names of assets. As will be appreciated by those skilled in the art, a number of text string matching techniques may be used to match assets despite the differing naming conventions.

If a single match is found, then the VOD stream associated with the matched asset is determined to be correlated with the XOD transaction error 350. However, if there is more than one remaining stream, the remaining streams are correlated with other XOD transaction errors 355. If a single VOD stream cannot be correlated with other XOD transaction errors 360, that single stream is determined to be correlated with the XOD transaction error 365.

In another embodiment of the present invention, if no single VOD stream may be correlated to the XOD transaction error, then the XOD transaction error is correlated using the timestamp, QAM output port, and requesting STB's VOD service group 370. The streams meeting this correlation criteria are identified 375. A determination is made whether the XOD transaction error data can be associated with a single stream from the VOD content server 380. If a single match is found, then the VOD stream associated with the matched asset is determined to be correlated with the XOD transaction error 385.

In another embodiment of the present invention, if after this process more than one stream remains or no streams remain, the VOD transaction error logs are consulted to determine whether the session failed from within the VOD server. As previously described, an elimination process is used whereby VOD transaction errors are matched with XOD transaction errors. If a single VOD transaction error remains after this process, that VOD transaction is considered correlated with the XOD transaction.

If all of these tests fail, the XOD transaction error is stored as partially correlated and flagged as incomplete in the database 390. On later runs, the script will continue attempting to correlate these partially correlated streams in hopes that the data "catches up" with the transaction error. In an exemplary embodiment of the present invention, after a fixed period of time 392 the stream is marked as unidentifiable 394, and no further attempts are made to correct it 396.

The correlated data comprise the XOD server error data to which video stream fulfillment data as determined by the VOD content server (not illustrated) has been appended. Video stream fulfillment data comprise the path through the VOD content server taken by a request for video content.

Referring again to FIG. 3A, table "B" within VOD local datastore 245 further comprises filtered VOD transaction data to which the video stream fulfillment data, to the extent known, has been appended and, where appropriate, to which an incomplete flag has been appended.

FIG. 5 illustrates a process by which a VOD local datastore is populated with correlated and partially correlated XOD error transaction data according to an embodiment of the present invention. Referring to FIG. 5, the error logs on the XOD server are accessed 500 and saved as table A of a VOD local datastore 505. A CCS datastore is accessed 515 and subscriber data is acquired. Subscriber information is used to determine if the subscriber is entitled to receive the program content requested by the subscriber. A correlator eliminates these transaction errors from the XOD transaction error data reported by XOD server error log and saves the filtered data to table B of the VOD local datastore 520. VOD content server logs are then accessed 525. The filtered data are then correlated with the VOD error data as previously described 530. The path of the video stream associated with each VOD error in table B is then appended to the VOD error data and stored in table B 535.

Referring again to FIG. 2, result analyzer 250 applies algorithms to the VOD transaction error data to determine whether a particular transaction error or group of transaction errors is associated with a common fault. In another embodiment of the present invention, result analyzer 250 issues alert messages to designated addresses. The alert messages may be, without limitation, issued as e-mail messages, paging messages, text messages, or computer-generated voice messages.

The correlated, filtered transaction error data and the result analyzer output are forwarded to a translator 255 that assigns descriptive names to network components associated with transaction errors. By way of illustration and not as a limitation, a QAM modulator may be identified in the network by an alphanumeric identifier such as QX17931. In another embodiment of the present invention, translator 255 assigns this device the descriptive name "QAM MOD" and appends the network identifier to the name.

In an embodiment of the present invention, VOD analysis server 240 further comprises a display server 258. The "translated" interactive graphical display is forwarded to the VOD checker client 200 and displayed on display 208. The content of the interactive graphical display represents an analytical record of VOD errors. VOD checker query interface 204 then causes processor 216 to output the interactive graphical display to display 208.

Figure 4A:
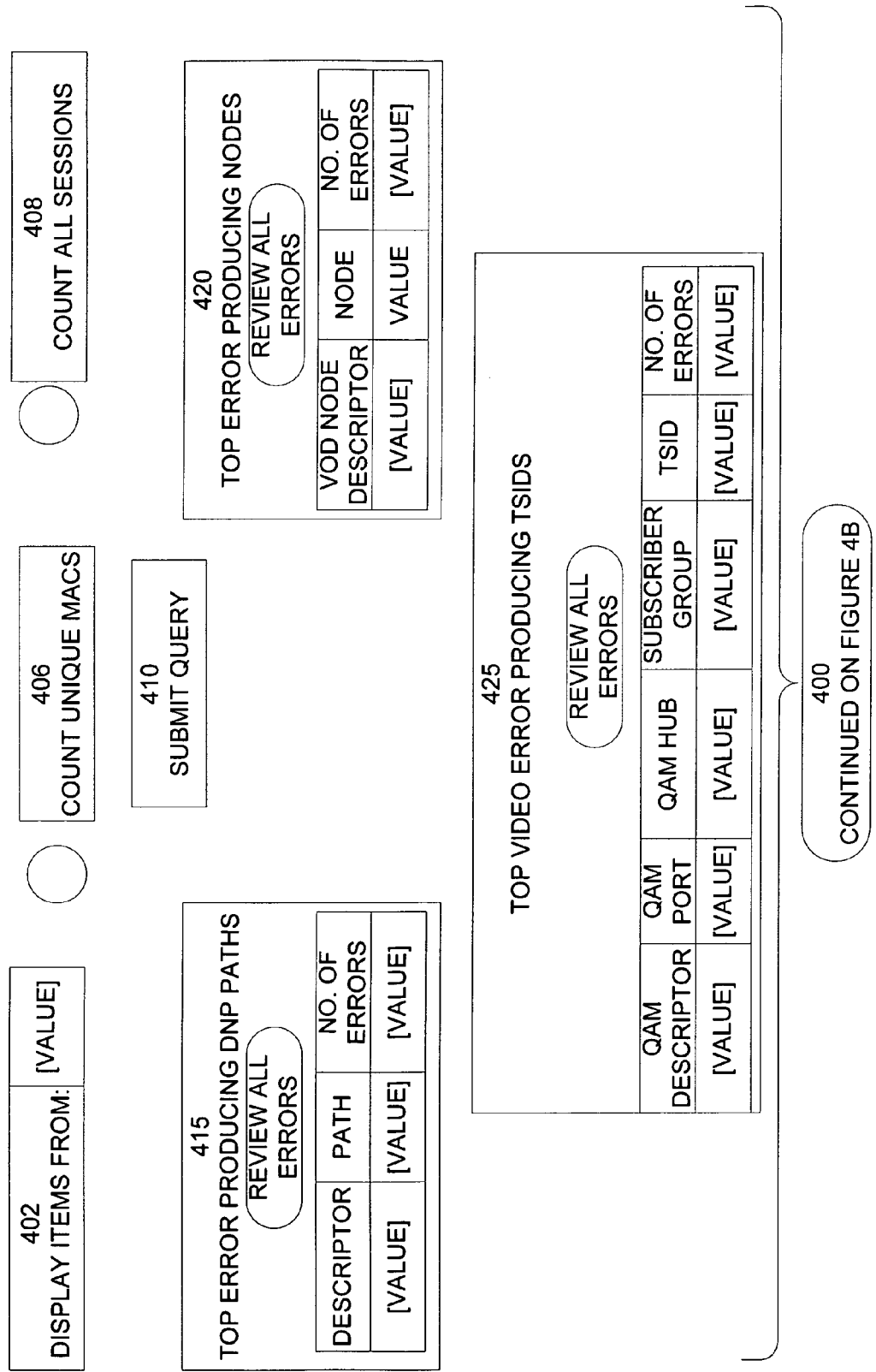

FIGS. 4A and 4B illustrate an interactive graphical display is produced by a VOD analysis server according to an embodiment of the present invention. Referring to FIG. 4A, an interactive graphical display 400 comprises data blocks for TOP ERROR PRODUCING DNP PIPES 415, TOP ERROR PRODUCING NODES 420, and TOP VIDEO ERROR PRODUCING TSIDS 425. Interactive graphical display 400 further comprises a DISPLAY ITEMS FROM 402 linked object, a COUNT UNIQUE MACs 406 linked object, a COUNT ALL SESSIONS 408 linked object, and a SUBMIT QUERY 410 linked object. Data blocks comprise label-value pairs (LVPs), where the label is a descriptor of a data element and the value represents the value assigned to the data element. Linked objects comprise hyperlinked commands that permit a user of VOD checker client (see, FIG. 2, 200) to select query parameters that are recognized by VOD analysis server (see, FIG. 2, 240).

TOP ERROR PRODUCING DNP PIPES 415 data block provides VOD transaction error statistics relating to a particular video stream path within the VOD content server that a video stream can follow. This data block comprises LVPs "Descriptor," "Path," and "No. of Errors." The value assigned to the label "Descriptor" provides descriptive text of the path with which a VOD transaction error is associated. The label "Path" is assigned a value representing the actual path identifier as recognized by the VOD content server. The label "No. of Errors" is assigned a value of the number of errors that have been associated with a particular path over a set period of time. The path identifier further comprises codes representing the VOD content server cluster, the VOD content server, (sometimes referred to as the VOD node), the VOD server slice (an I/O card), and the output port on the card.

TOP ERROR PRODUCING NODES 420 data block provides VOD transaction error statistics relating to a particular VOD node on a VOD server. This data block comprises LVPs "VOD Node Descriptor," "Node," and "No. of Errors." The value assigned to the label "VOD Node Descriptor" provides descriptive text of the VOD node (VOD server) on which a VOD transaction error is associated. The label "Node" is assigned a value representing the actual node identifier as recognized by the VOD content server. The label "No. of Errors" is assigned a value of the number of errors that have been associated with a particular VOD node over a set period of time.

TOP ERROR PRODUCING TSIDS 425 data block provides VOD transaction error statistics relating to a particular input port on QAM modulator. This data block comprises LVPs "QAM Descriptor," "QAM Port," "QAM Hub" "Subscriber Group," "TSID," and "No. of Errors." The value assigned to the label "QAM Descriptor" provides descriptive text of the QAM modulator associated with a specific TSID. The label "QAM Port" is assigned a value representing the port on the QAM on which the TSID is terminated. The label "Subscriber Group," is assigned a value indicative of the QAM and QAM Hub to which the TSID is associated. The label "TSID" is assigned a value indicative of a transport stream identifier. The TSID identifies a QAM channel assigned by the XOD server to transport a particular VOD content stream. The label "No. of Errors" is assigned a value of the number of errors that have been associated with a particular TSID over a set period of time.

Referring to FIG. 4B, interactive graphical display further comprises data blocks for TOP ERROR PRODUCING CLUSTERS 430, TOP ERROR PRODUCING ASSETS 435, TOP ERROR PRODUCING SLICES 440, TOP XOD ERRORS GENERATED 445, and TOP ERROR PRODUCING QPSKS 450.

TOP ERROR PRODUCING CLUSTERS 430 data block provides VOD transaction error statistics relating to a particular cluster of VOD content servers. This data block comprises LVPs "VOD Cluster Descriptor," "Cluster," and "No. of Errors." The value assigned to the label "VOD Cluster Descriptor" provides descriptive text of the VOD cluster (a grouping of VOD servers) on which a VOD transaction error is associated. The label "Cluster" is assigned a value representing the actual cluster identifier as recognized by the VOD content server. The label "No. of Errors" is assigned a value of the number of errors that have been associated with a particular cluster over a set period of time.

TOP ERROR PRODUCING ASSETS 435 data block provides VOD transaction error statistics relating to a particular asset (a content file) of a VOD content server. This data block comprises LVPs "Asset," and "No. of Errors." The value assigned to the label "Asset" provides an identifier associated with a particular content file stored on the VOD content server. The label "No. of Errors" is assigned a value of the number of errors that have been associated with a particular asset over a set period of time.

TOP ERROR PRODUCING SLICES 440 data block provides VOD transaction error statistics relating to a particular slice (an I/O card) of a VOD content server. This data block comprises LVPs "Slice," and "No. of Errors." The value assigned to the label "slice" provides an identifier associated with a particular I/O card on the VOD content server to which an asset has been assigned for delivery to a QAM. The label "No. of Errors" is assigned a value of the number of errors that have been associated with a particular slice over a set period of time.

TOP XOD ERRORS GENERATED 445 data block provides the most frequently occurring XOD transaction errors as reported by the XOD server error log (see, FIG. 2, 265). This data block comprises LVPs "Error," and "No. of Errors." The value assigned to the label "Error" provides an identifier associated with a particular error reported by the XOD server error log (see, FIG. 2, 265). The label "No. of Errors" is assigned a value of the number of occurrences of that particular error over a set period of time.

TOP ERROR PRODUCING QPSKs 450 data block provides VOD transaction error statistics relating to a particular QPSK. This data block comprises LVPs "QPSK," and "No. of Errors." The value assigned to the label "QPSK" provides an identifier assigned to a particular QPSK associated with a VOD transaction error. The label "No. of Errors" is assigned a value of the number of VOD transaction errors associated with a particular QPSK over a set period of time.

Each of the data blocks described above further comprises a linked object labeled "REVIEW ALL ERRORS." When a user selects a "REVIEW ALL ERRORS" linked object from within a data block, additional data relevant to that data block are retrieved from the local VOD datastore (see, FIG. 2, 245).

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A video-on-demand (VOD) analysis server for a hybrid fiber coax (HFC) cable network comprising:
 a query library comprising instructions for:
  acquiring raw XOD transaction error data from an XOD server, wherein the raw XOD transaction error data comprise an identifier associating a raw XOD transaction error with a subscriber;
  acquiring XOD-related subscriber information from a subscriber datastore;
  acquiring VOD transaction data from a VOD server;
 a correlator adapt comprising instructions for:
  acquiring the raw XOD transaction error data by executing instructions from the query library for acquiring raw XOD transaction error data from an XOD server;
  determining from the XOD-related subscriber information that a subscriber is not entitled to receive XOD service;
  creating filtered XOD transaction error data by removing from the raw XOD transaction error data XOD transaction errors associated with the subscriber; and
  correlating a filtered XOD transaction error with VOD transaction data to identify a video stream path of the filtered XOD transaction error.

2. The VOD analysis server of claim 1, wherein XOD transaction error data are selected from the group consisting of a timestamp, a QAM output port, an asset name, a geographical area, and a VOD service group.

3. The VOD analysis server of claim 1, wherein VOD transaction data comprise a VOD server identifier, a VOD slice identifier, a VOD output port identifier, a stream identifier, and an asset name.

4. The VOD analysis server of claim 1, wherein XOD-related subscriber information comprises VOD entitlement data indicative of the right of the subscriber to receive VOD service.

5. The VOD analysis server of claim 1, wherein the correlator further comprises instructions for:
 storing the raw XOD transaction error data in a local VOD datastore;
 creating correlated XOD transaction error data comprising the filtered XOD transaction error and the video stream path associated with the filtered XOD transaction error; and
 storing the correlated XOD transaction error data in the VOD local datastore.

6. The VOD analysis server of claim 5 further comprising:
 a VOD data retrieval manager, wherein the VOD data retrieval manager comprises instructions for:
  polling the local VOD datastore for the correlated XOD transaction error data; and providing the correlated XOD transaction error data to a display server, wherein the display server comprises instructions for:
  extracting error data elements from the correlated XOD transaction error data;
  creating a VOD analytical record comprising the error data elements; and
  sending the VOD analytical record to a VOD checker client for display.

7. The VOD analysis server of claim 6, wherein the VOD checker client comprises a Web browser and wherein the analytical record comprises a Web page.

8. The VOD analysis server of claim 5 further comprising a result analyzer, wherein the result analyzer comprises instructions for:
  extracting error data elements from the correlated XOD transaction error data;
  selecting error data elements determined to be outside a predetermined range;
  determining if the selected error data elements are indicative of a common fault; and
  identifying the common fault in the analytical record if the selected error data elements are indicative of a common fault.

9. The VOD analysis server of claim 1 further comprising a client network interface, wherein the client network interface comprises instructions for communicating with the VOD checker client via a client network.

10. The VOD analysis server of claim 9, wherein the client network is selected from the group consisting of a wired network, a wireless network, a local area network, and the Internet.

11. A method for analyzing video-on-demand (VOD) transaction errors in a hybrid fiber coax (HFC) cable network comprising:
  acquiring raw XOD transaction error data from an XOD server, wherein the raw XOD transaction error data comprise an identifier associating a raw XOD transaction error with a subscriber;
  acquiring XOD-related subscriber information from a subscriber datastore;
  acquiring VOD transaction data from a VOD server;
  determining from the XOD-related subscriber information that the subscriber is not entitled to receive XOD service;
  creating filtered XOD transaction error data by removing from the raw XOD transaction error data XOD transaction errors associated with the subscriber; and
  correlating a filtered XOD transaction error with VOD transaction data to identify a video stream path of the filtered XOD transaction error.

12. The method for analyzing VOD transaction errors of claim 11, wherein XOD transaction error data are selected from the group consisting of a timestamp, a QAM output port, an asset name, a geographical area, and a VOD service group.

13. The method for analyzing VOD transaction errors of claim 11, wherein VOD transaction data comprise a VOD server identifier, a VOD slice identifier, a VOD output port identifier, a stream identifier, and an asset name.

14. The method for analyzing VOD transaction errors of claim 11, wherein XOD-related subscriber information comprises VOD entitlement data indicative of the right of the subscriber to receive VOD service.

15. The method for analyzing VOD transaction errors of claim 11 further comprising:
  storing the raw XOD transaction error data in a local VOD datastore;
  creating correlated XOD transaction error data comprising the filtered XOD transaction error and the video stream path associated with the filtered XOD transaction error; and
  storing the correlated XOD transaction error data in the VOD local datastore.

16. The method for analyzing VOD transaction errors of claim 15 further comprising:
  polling the local VOD datastore for the correlated XOD transaction error data; extracting
  error data elements from the correlated XOD transaction error data;
  creating a VOD analytical record comprising the error data elements; and
  sending the VOD analytical record to a VOD checker client for display.

17. The method for analyzing VOD transaction errors of claim 16, wherein the VOD checker client comprises a Web browser and the analytical record comprises a Web page.

18. The method for analyzing VOD transaction errors of claim 15 further comprising:
  extracting error data elements from the correlated XOD transaction error data;
  selecting error data elements determined to be outside a predetermined range;
  determining if the selected error data elements are indicative of a common fault; and
  identifying the common fault in the analytical record if the selected error data elements are indicative of a common fault.

19. The method for analyzing VOD transaction errors of claim 11 further comprising communicating with the VOD checker client via a client network.

20. The method for analyzing VOD transaction errors of claim 19, wherein the client network is selected from the group consisting of a wired network, a wireless network, a local area network, and the Internet.

* * * * *